(12) United States Patent
Zhamu et al.

(10) Patent No.: US 8,652,362 B2
(45) Date of Patent: Feb. 18, 2014

(54) NANO GRAPHENE-MODIFIED CURING AGENTS FOR THERMOSET RESINS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 997 days.

(21) Appl. No.: 12/460,663

(22) Filed: Jul. 23, 2009

(65) Prior Publication Data

US 2011/0017955 A1     Jan. 27, 2011

(51) Int. Cl.
*H01B 1/00*     (2006.01)
*H01B 1/20*     (2006.01)

(52) U.S. Cl.
USPC ........... 252/511; 252/502; 252/510; 524/496; 977/700; 977/755; 977/773; 977/778

(58) Field of Classification Search
USPC ........... 252/502, 511, 510; 523/468; 524/496; 977/700, 755, 773, 778
See application file for complete search history.

(56) References Cited

U.S. PATENT DOCUMENTS

| | | |
|---|---|---|
| 2,798,878 A | 7/1957 | Hummers |
| 7,071,258 B1 | 7/2006 | Jang et al. |

OTHER PUBLICATIONS

U.S. Appl. No. 11/800,728, filed May 8, 2007, A. Zhamu, et al.
C. Lee, et al., "Measurement of the Elastic Properties and Intrinsic Strength of Monolayer Graphene," Science, 321 (Jul. 2008) 385-388.
A. Balandin, et al. "Superior Thermal Conductivity of Single-Layer Graphene," Nano Lett., 8 (3) (2008) 902-907.
Bor Z. Jang and A Zhamu, "Processing of Nano Graphene Platelets (NGPs) and NGP Nanocomposites: A Review," J. Materials Sci. 43 (2008) 5092-5101.

*Primary Examiner* — Mark Kopec
*Assistant Examiner* — Haidung Nguyen

(57) ABSTRACT

The present invention provides a modified curing agent for a thermosetting resin, such as epoxy resin. As one example, the epoxy curing agent comprises: (a) multiple nano graphene platelets; (b) a chemical functional group having multiple ends with a first end being bonded to a nano graphene platelet and at least a second end reactive with the epoxy resin; and (c) reactive molecules acting as a primary cross-linking agent for the epoxy resin; wherein the nano graphene platelet content is no less than 0.01% by weight based on the total weight of the modified curing agent. A modified curing agent containing reactive molecule-functionalized NGPs enable excellent dispersion of NGP in a resin matrix and the resulting nanocomposites exhibit much better properties than those of corresponding nanocomposites prepared by directly mixing dried NGPs with the thermosetting resins.

21 Claims, 7 Drawing Sheets

NANO GRAPHENE-MODIFIED CURING AGENTS FOR THERMOSET RESINS

The present invention is a result of a research and development project sponsored by the US National Science Foundation Small Business Technology Transfer (STTR) Program.

FIELD OF THE INVENTION

The present invention relates generally to the field of thermosetting or thermoset resins and resin matrix composites. In particular, the invention provides a curing agent modified by nano graphene platelets (NGPs), also known as graphene nano sheets or graphene nano ribbons. This invention also provides nanocomposite materials obtained from such NGP-modified curing agents. This invention provides methods and processes for producing curing agents modified by pristine NGPs or their oxidized versions, also known as graphite oxide nano platelets.

BACKGROUND OF THE INVENTION

Nanocomposites containing nano-scaled fillers possess unique features and functions unavailable in conventional fiber-reinforced polymers. One major filler development in the past two decades is the carbon nanotube (CNT), which has a broad range of nanotechnology applications. However, attempts to produce CNT in large quantities have been fraught with overwhelming challenges due to poor yield and costly fabrication and purification processes. Hence, even the moderately priced multi-walled CNTs remain too expensive to be used in high-volume polymer composite and other functional or structural applications. Further, for many applications, processing of nanocomposites with high CNT concentrations has been difficult due to the high melt viscosity.

Instead of trying to develop lower-cost processes for CNTs, the applicants sought to develop an alternative nanoscale carbon material with comparable properties that can be produced much more cost-effectively and in larger quantities. This development work led to the discovery of processes and compositions for a new class of nano material now commonly referred to as nano graphene platelets (NGPs), graphene nano sheets, or graphene nano ribbons [e.g., B. Z. Jang and W. C. Huang, "Nano-scaled graphene plates," U.S. Pat. No. 7,071,258, Jul. 4, 2006].

An NGP is a platelet, sheet, or ribbon composed of one or multiple layers of graphene plane, with a thickness as small as 0.34 nm (one carbon atom thick). A single-layer graphene is composed of carbon atoms forming a 2-D hexagonal lattice through strong in-plane covalent bonds. In a multi-layer NGP, several graphene planes are weakly bonded together through van der Waals forces in the thickness-direction. Multi-layer NGPs can have a thickness up to 100 nm. Conceptually, an NGP may be viewed as a flattened sheet of a carbon nano-tube (CNT), with a single-layer graphene corresponding to a single-wall CNT and a multi-layer graphene corresponding to a multi-wall CNT. However, this very difference in geometry also makes electronic structure and related physical and chemical properties very different between NGP and CNT. It is now commonly recognized in the field of nanotechnology that NGP and CNT are two different and distinct classes of materials.

NGPs are predicted to have a range of unusual physical, chemical, and mechanical properties and several unique properties have been observed. For instance, single-layer graphene (also referred to as single-sheet NGP) was found to exhibit the highest intrinsic strength and highest thermal conductivity of all existing materials [C. Lee, et al., "Measurement of the Elastic Properties and Intrinsic Strength of Monolayer Graphene," Science, 321 (July 2008) 385-388; A. Balandin, et al. "Superior Thermal Conductivity of Single-Layer Graphene," *Nano Lett.*, 8 (3) (2008) 902-907]. Single-sheet NGPs possess twice the specific surface areas compared with single-walled CNTs. In addition to single-layer graphene, multiple-layer graphene platelets also exhibit unique and useful behaviors. Single-layer and multiple-layer graphene are herein collectively referred to as NGPs. Graphene platelets may be oxidized to various extents during their preparation, resulting in graphite oxide or graphene oxide (GO) platelets. In the present context, NGPs refer to both "pristine graphene" containing no oxygen and "GO nano platelets" of various oxygen contents. It is helpful to herein describe how NGPs are produced.

The processes that have been used to prepare NGPs were recently reviewed by the applicants [Bor Z. Jang and A Zhamu, "Processing of Nano Graphene Platelets (NGPs) and NGP Nanocomposites: A Review," *J. Materials Sci.* 43 (2008) 5092-5101]. As illustrated in FIG. 1, the most commonly used process entails treating a natural graphite powder (referred to as Product (A) in FIG. 1) with an intercalant and an oxidant (e.g., concentrated sulfuric acid and nitric acid, respectively) to obtain a graphite intercalation compound (GIC) or, actually, graphite oxide (GO) (referred to as Product (B) in FIG. 1). Prior to intercalation or oxidation, graphite has an inter-graphene plane spacing of approximately 0.335 nm ($L_d = \frac{1}{2} d_{002} = 0.335$ nm or 3.35 Å, based on X-ray diffraction data readily available in open literature). There is a misconception in the scientific community that van der Waals forces are weak forces, which needs some qualifications. It is well-known that van der Waals forces are short range forces, but can be extremely strong in magnitude if the separation between two objects (e.g., two atoms or molecules) is very small, say <0.4 nm. However, the magnitude of van der Waals forces drops precipitously when the separation increases just slightly. Since the inter-graphene plane distance in un-intercalated and un-oxidized graphite crystal is small (<0.34 nm), the inter-graphene bonds (van der Waals forces) are actually very strong.

With an intercalation or oxidation treatment, the inter-graphene spacing is increased to a value typically greater than 0.55-0.65 nm. This is the first expansion stage experienced by the graphite material. The van der Waals forces are now significantly weakened due to the increased spacing. It is important to note that, in most cases, some of the graphene layers in a GIC are intercalated (with inter-graphene spacing increased to 0.55-0.65 nm and van der Waals forces weakened), but other layers could remain un-intercalated or incompletely intercalated (with inter-graphene spacing remaining approximately 0.34 nm and van der Waals forces staying strong).

In the conventional processes, the obtained GIC or GO, dispersed in the intercalant solution, will need to be rinsed for several cycles and then dried to obtain GIC or GO powders. These dried powders, commonly referred to as expandable graphite, are then subjected to further expansion or second expansion (often referred to as exfoliation) typically using a thermal shock exposure approach (at a temperature from 650° C. to 1,100° C.). The acid molecules residing in the inter-graphene spacing are decomposed at such a high temperature, generating volatile gas molecules that could push apart graphene planes. The inter-flake distance between two loosely connected flakes or platelets is now increased to the range of typically >20 nm to several μm (hence, very weak van der Waals forces).

Unfortunately, typically a significant portion of the gaseous molecules escape without contributing to exfoliation of graphite flakes. Further, those un-intercalated and incompletely intercalated graphite layers remain intact (still having an inter-graphene spacing of approximately <0.34 nm). Additionally, many of the exfoliated flakes re-stack together by re-forming van der Waals forces if they could not be properly separated in time. These effects during this exfoliation step led to the formation of exfoliated graphite (referred to as Product (C) in FIG. 1), which is commonly referred to as "graphite worm" in the industry.

The exfoliated graphite or graphite worm is characterized by having networks of interconnected (un-separated) flakes which are typically >50 nm thick (often >100 nm thick). These individual flakes are each composed of hundreds of layers with inter-layer spacing of approximately 0.34 nm (not 0.6 nm), as evidenced by the X-ray diffraction data readily available in the open literature. In other words, these flakes, if separated, are individual graphite particles, rather than graphite intercalation compound (GIC) particles. This thermal shock procedure can produce some separated graphite flakes or graphene sheets, but normally the majority of graphite flakes remain interconnected. Again, the inter-flake distance between two loosely connected flakes or platelets is now increased to from 20 nm to several μm and, hence, the ven der Waals forces that hold them together are now very weak, enabling easy separation by mechanical shearing or ultrasonication.

Typically, the exfoliated graphite or graphite worm is then subjected to a flake separation treatment using air milling, mechanical shearing, or ultrasonication in a liquid (e.g., water). Hence, a conventional process basically entails three distinct procedures: first expansion (oxidation or intercalation), further expansion (so called "exfoliation"), and separation. The resulting NGPs are graphene oxide (GO), rather than pristine graphene.

It is important to note that the separation treatment (e.g. using ultrasonication or shearing) is to separate those thick flakes from one another (breaking up the graphite worm or sever those weak interconnections), and it is not intended for further peeling off individual graphene planes. In the prior art, a person of ordinary skill would believe that ultrasonication is incapable of peeling off non-intercalated/un-oxidized graphene layers. In other words, in the conventional processes, the post-exfoliation ultrasonication procedure was meant to break up graphite worms (i.e., to separate those already largely expanded/exfoliated flakes that are only loosely connected). Specifically, it is important to further emphasize the fact that, in the prior art processes, ultrasonification is used after intercalation and oxidation of graphite (i.e., after first expansion) and most typically after thermal shock exposure of the resulting GIC or GO (i.e., after second expansion or exfoliation) to aid in breaking up those graphite worms. There are already much larger spacings between flakes after intercalation and/or after exfoliation (hence, making it possible to easily separate flakes by ultrasonic waves). This ultrasonication was not perceived to be capable of separating those un-intercalated/un-oxidized layers where the inter-graphene spacing remains <0.34 nm and the van der Waals forces remain strong.

The applicant's research group was the very first in the world to surprisingly observe that, under proper conditions (e.g., with the assistance of a surfactant), ultrasonication can be used to produce ultra-thin graphene directly from graphite, without having to go through chemical intercalation or oxidation. This invention was reported in a patent application [A. Zhamu, J. Shi, J. Guo, and Bor Z. Jang, "Method of Producing Exfoliated Graphite, Flexible Graphite, and Nano Graphene Plates," U.S. patent Pending, Ser. No. 11/800,728 (May 8, 2007)]. Schematically shown in FIG. 2 are the essential procedures used to produce single-layer or few-layer graphene using this direct ultrasonication process. This innovative process involves simply dispersing graphite powder particles in a liquid medium (e.g., water, alcohol, or acetone) containing a dispersing agent or surfactant to obtain a suspension. The suspension is then subjected to an ultrasonication treatment, typically at a temperature between 0° C. and 100° C. for 10-120 minutes. No chemical intercalation or oxidation is required of the starting material prior to ultrasonication. The graphite material has never been exposed to any obnoxious chemical. This process combines expansion, exfoliation, and separation of pristine graphitic material into one step. Hence, this simple yet elegant method obviates the need to expose graphite to a high-temperature, or chemical oxidizing environment. The resulting NGPs are essentially pristine graphene, which is highly conductive both electrically and thermally.

In order for NGPs (either pristine graphene or graphene oxide) to be an effective nano-filler or reinforcement in a polymer matrix, NGPs must be uniformly dispersed in the polymer matrix and there must be adequate compatibility or interfacial bonding between NGPs and the matrix polymer. In other words, proper dispersion of NGPs in a matrix would be a prerequisite to achieving good electrical, thermal, and mechanical properties of the resulting composite materials. However, using epoxy resin as an example, a filler-resin composite is usually made by sequentially mixing epoxy (or epoxide) resin and a curing agent (optionally with an accelerator) to form a reactive mixture first, and then dispersing fillers into the epoxide resin-curing agent mixture. In some cases, the three ingredients are mixed concurrently. Unfortunately, the resulting NGP-epoxy composites prepared with these two processes tended to exhibit poor NGP dispersions and lower-than-expected mechanical, thermal, and electrical properties.

It is therefore an object of the present invention to provide a cost-effective, simple, and easily achievable approach to achieving good NGP dispersion in epoxy resins and good interfacial bonding between NGPs and the epoxy matrix.

It is another object of the present invention to provide an NGP-modified curing agent for use in an epoxy-based nano-composite.

It is yet another object of the present invention to provide an NGP composite that exhibits improved properties.

SUMMARY OF THE INVENTION

The present invention provides an NGP-modified curing agent that significantly improves the NGP dispersion in a thermosetting resin matrix, such as epoxy resin. The resulting nanocomposite exhibits significantly improved physical properties. The modified curing agent of the present invention comprises three major components: (a) a plurality of NGPs; (b) a chemical functional group having multiple ends, with a first end being bonded to the nano graphene platelet and at least a second end that is capable of reacting with the epoxy resin; and (c) reactive molecules acting as a primary cross-linking agent for the epoxy resin; wherein the nano graphene platelet content is no less than 0.01% by weight based on the total weight of the modified curing agent. In one preferred embodiment, the chemical functional group specified in (b) is derived from the reactive molecules specified in (c). These reactive molecules are the major ingredient in all of the commonly used curing agents for thermoset resins.

In the modified curing agent, the nano graphene platelet may be a single-layer graphene or multi-layer graphene. The NGP can be pristine graphene or graphene oxide. The pristine graphene is preferably produced by direct ultrasonication of a graphitic material that is not preintercalated and not pre-oxidized. The non-preintercalated and non-oxidized graphitic material may be selected from the group consisting of natural graphite, synthetic graphite, highly oriented pyrolytic graphite, carbon or graphite fiber, carbon or graphitic nano-fiber, meso-carbon micro-bead, and combinations thereof.

The chemical functional group and the reactive molecules may be selected from the group consisting of amidoamines, polyamides, aliphatic amines, modified aliphatic amines, cycloaliphatic amines, aromatic amines, anhydrides, ketimines, diethylenetriamine, triethylene-tetramine, tetra-ethylene-pentamine, polyethylene polyamine, polyamine epoxy adduct, phenolic hardener, non-brominated curing agent, non-amine curatives, polyols, polyisocyanates, and combinations thereof. These functional groups are multi-functional, with the capability of reacting with at least two chemical species from at least two ends. Most importantly, they are capable of bonding to the edge or surface of graphene using one of their ends and, during subsequent thermoset resin curing stage, are able to react with the resin component (e.g., epoxide or epoxy of a two-component resin) at one or two other ends. The modified curing agent may contain NGPs with an epoxy group bonded thereto. Such a pre-epoxidized NGP is naturally compatible with both the epoxy resin and the un-modified curing agent.

Another preferred embodiment of the present invention is a modified curing agent comprising: (a) a plurality of chemically functionalized nano graphene platelets having at least a chemical functional group reactive with a thermosetting resin; and (b) reactive molecules acting as a primary cross-linking agent for the thermosetting resin; wherein the functionalized nano graphene platelets are dispersed in the reactive molecules and the platelets occupy no less than 0.01% by weight based on the total weight of the modified curing agent. In addition to epoxy, the same NGP-modified curing agent approach is applicable to other types of two-part thermosetting resins, such as unsaturated polyester, phenolic, polyimide, polyurethane, polyamide-imide, and thermosetting elastomers or rubbers that require a cross-linking reaction to harden the resin.

The modified curing agent may be mixed with an epoxy resin or any other thermosetting resin to form a reactive mixture. This mixture may be further reinforced with other additives, such as carbon fibers, glass fibers, polymer fibers, inorganic fillers, organic fillers, metal wires or fibers, carbon nano-fibers, carbon nanotubes, nano-rods, nano-wires, nano-tubes, nano-fibers, metal nano particles, ceramic nano particles, etc. For instance, this reactive mixture may be used as a matrix resin to prepare the pre-impregnated fibers or woven fabrics (so-called "prepreg"), which are precursors to a final composite structure.

DETAILED DESCRIPTION OF PREFERRED EMBODIMENTS

Figure 1:
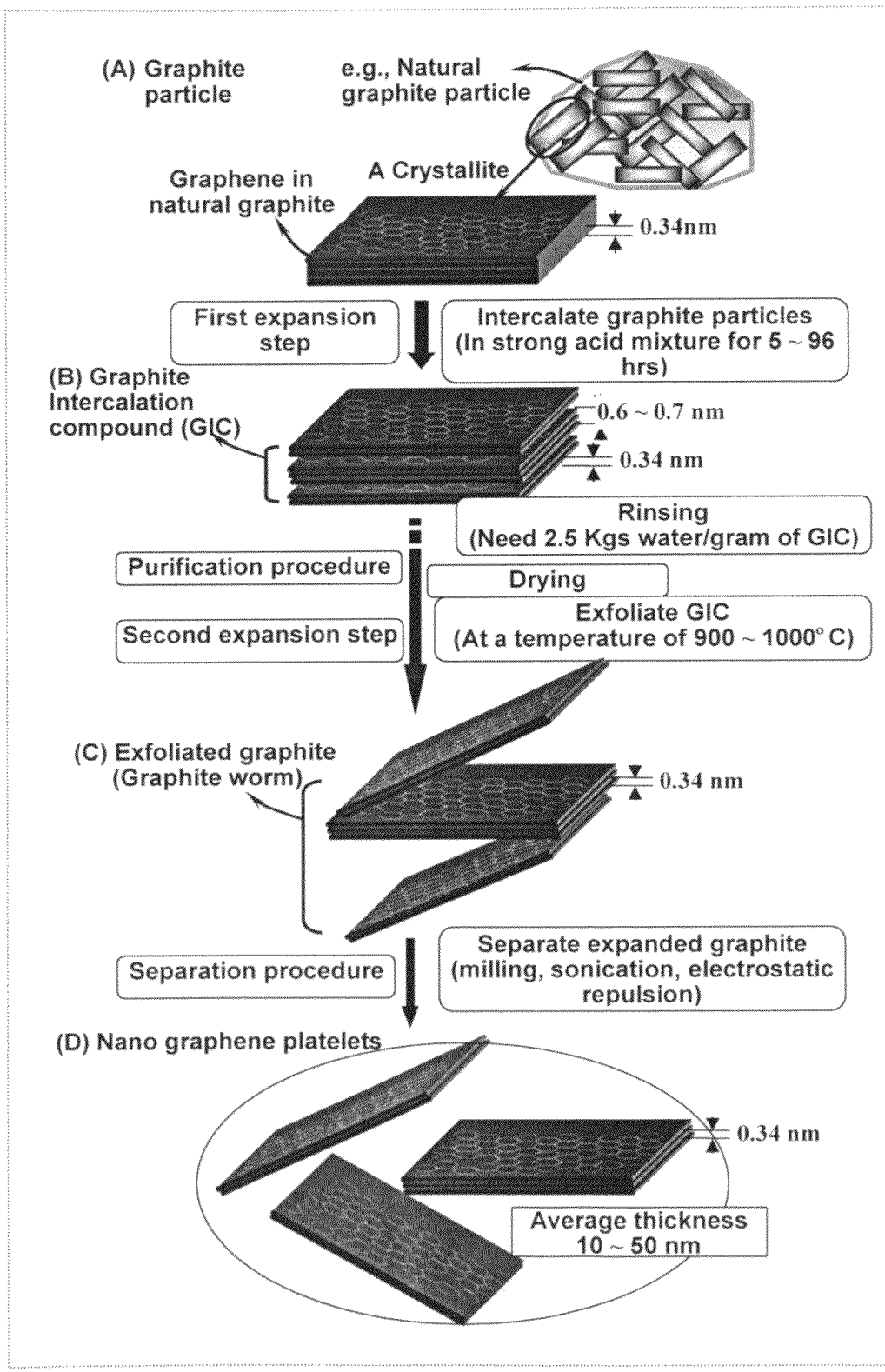
FIG. 1 Schematic of conventional processes for producing oxidized NGPs (also referred to as oxidized graphite nano platelets).
Figure 2:
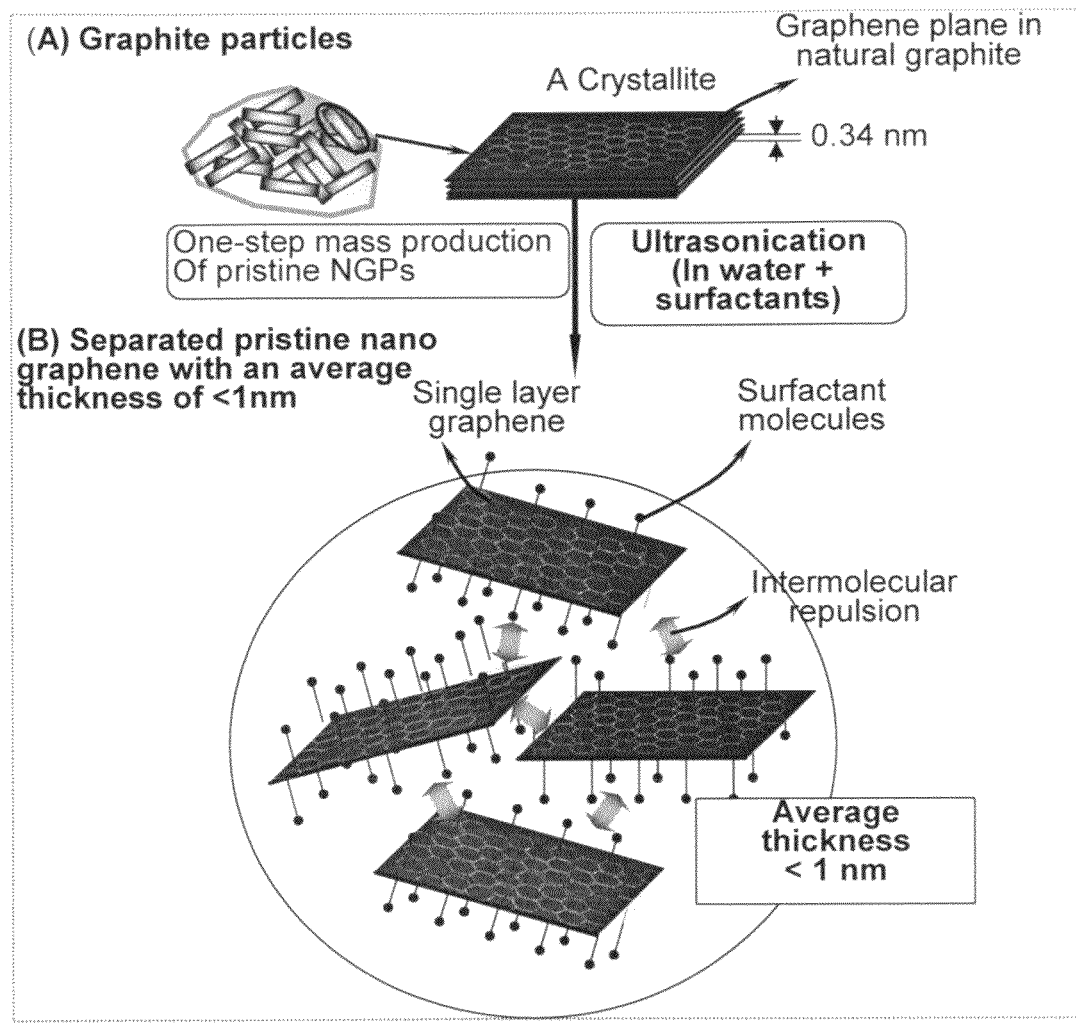
FIG. 2 Schematic of the direct ultrasonication process by which a pristine graphite material, without pre-intercalation or pre-oxidation (without exposing to any undesirable chemical such as sulfuric acid and nitric acid), can be directly exfoliated and separated into ultra-thin pristine NGPs.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure." These graphitic materials may be regarded as three-dimensional entities.

Over the last two decades, two types of carbon allotropes were discovered: the zero-dimensional fullerene and one-dimensional carbon nanotube (CNT), which have significantly advanced the field of nano materials and nanotechnology. In most recent years, a new class of carbon-based material was developed—the nano graphene platelet (NGP). NGP may be considered a two-dimensional carbon material. An NGP is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each platelet has a length and a width parallel to the graphite plane and a thickness orthogonal to the graphite plane. The thickness of an NGP is 100 nanometers (nm) or smaller and more typically thinner than 10 nm with a single-sheet NGP being as thin as 0.34 nm. The length and width of a NGP are typically between 1 μm and 20 μm, but could be longer or shorter.

NGPs have been shown to exhibit the highest intrinsic strength and highest thermal conductivity of all materials ever studied by scientists. NGPs also have exceptional elastic modulus (approximately 1 TPa or 1,000 GPa) and high electrical conductivity (up to 20,000 S/cm). NGPs, if incorporated as fillers in a composite material, are expected to impart outstanding properties to the matrix material.

In order for NGPs to be an effective nano-filler or reinforcement in a polymer matrix, NGPs must be uniformly dispersed in the polymer and there must be adequate compatibility or interfacial bonding between NGPs and the matrix polymer. In other words, good dispersion of NGPs in a matrix would be a prerequisite to achieving good electrical, thermal, and mechanical properties of the resulting composite materials. However, using epoxy resin as an example, an NGP composite was usually made by the procedures of (a) sequentially adding NGPs into a mixture of epoxide resin and a curing agent or (b) concurrently mixing NGPs, epoxide resin, and a curing agent to form a reactive mixture. Conventional wisdom has it that fillers must be added after the resin and the curing agent are thoroughly mixed. Unfortunately, the resulting NGP-epoxy composites prepared with these conventional methods tended to exhibit poor NGP dispersion and lower-than-expected mechanical, thermal, and electrical properties.

Further, it is also known or perceived in the art that homogeneous and thorough mixing of the epoxy resin and the curing agent cannot be easily achieved if a third, solid component (i.e., fillers) is present. After intensive research and development work, the applicants discover a new strategy that accomplishes homogeneous mixing of epoxy resin and curing agent, good dispersion of NGPs in the cured resin, and surprisingly good properties of the cured resin composite. This innovative strategy involves functionalizing NGPs with the primary reactive molecules of a curing agent (e.g., diethylenetriamine or DETA) and then either allowing the functionalized NGPs to stay in an excess amount of the same curing agent, or recovering the functionalized NGPs and adding them to a different curing agent to form a modified curing agent.

Using DETA as an example, one of the three —$NH_2$ groups is bonded to the edge or surface of an NGP (the remaining two un-reacted —$NH_2$ groups will be available for reacting with epoxy resin later). The $NH_2$-functionalized NGPs may be allowed to stay in the DETA liquid. Alternatively, the $NH_2$-functionalized NGPs may be recovered and dispersed into a different curing agent (e.g., triethylene-tetramine, TETA) to form an NGP-modified curing agent. The applicants found that these functionalized NGPs are well-dispersed in the liquid curing agent essentially indefinitely. In other words, these functionalized NGPs do not undergo sedimentation and the resulting modified curing agent has an extremely long shelf life.

Figure 3:
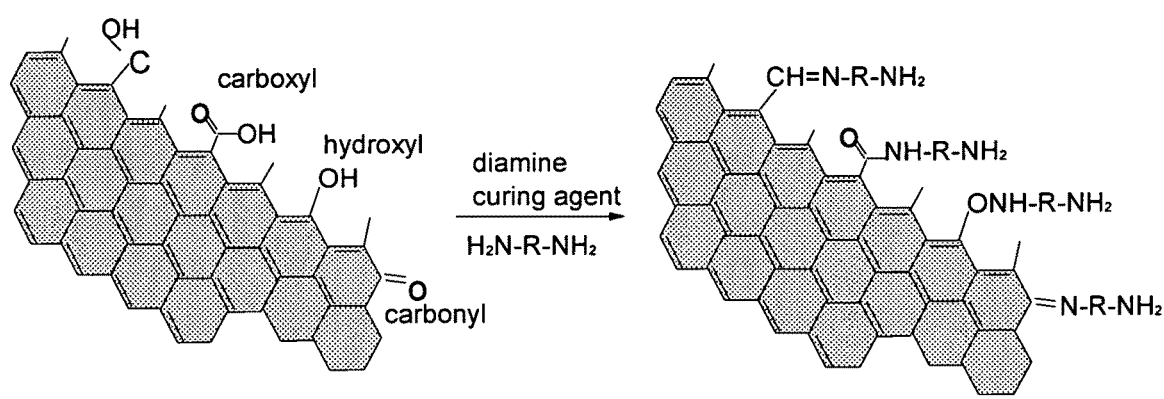
FIG. 3 Schematic of oxidized NGPs having initial functional groups (such as carboxyl and hydroxyl) that can react with commonly used curing agent molecules (such as polyamines).

Chemical functionalization of NGPs may be achieved by dispersing NGPs in a liquid curing agent with the functionalization procedure facilitated or promoted by heat, a catalyst, ultrasonication, or a combination thereof. As schematically shown in FIG. 3, there are many types of functional groups that are naturally present at the edge or surface of a graphene oxide platelet. Several of these groups (e.g. hydroxyl and carboxyl) can readily react with the reactive molecules that constitute a typical curing agent (e.g., polyamines). For instance, oxidized NGPs can be functionalized by TETA by dispersing NGPs in TETA at a concentration of 5-10% by weight and allowing reaction to proceed at 130° C. for three hours under a nitrogen environment.

Pristine graphene is essentially oxygen free and no functional group exists at the edge or on the graphene plane surface. Hence, one skilled in the art would not expect the possibility or feasibility of reacting pristine graphene directly with any commonly used curing agent. Most surprisingly, we have succeeded in functionalizing NGPs (pristine or oxidized version) with a wide range of curing agents by simply immersing NGPs in a liquid medium containing a curing agent and subjecting the resulting suspension to high-intensity ultrasonication. Ultrasonication appears to be capable of activating at least the edges of NGPs, enabling them to react with a functional group of a reactive molecule (typically being multi-functional or having multiple reactive ends) in a curing agent. This approach is applicable to both amine-based and non-amine based curing agents.

The chemical functional groups and the reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin at one or two other ends.

The applicants discover that the same NGP-modified curing agent approach is also applicable to other types of two-part thermosetting resins, such as unsaturated polyester, phenolic, polyimide, polyurethane, polyamide-imide, and thermosetting elastomers or rubbers that require a cross-linking reaction to harden the resin. For instance, hexamethylene-tetramine (HMTA) can be used to impart a desired functional group to NGPs and the resulting functionalized NGPs can be dispersed in HMTA as a modified curing agent for phenolic resins. NGP edges can be imparted with reactive functional groups from alpha-substituted acrylic acid derivatives and tetra-aryl succinic acid dinitriles. The functionalized NGPs can be dispersed in alpha-substituted acrylic acid derivatives and tetra-aryl succinic acid dinitriles, respectively, to form NGP-modified curing agents for unsaturated polyester resins.

Polyurethane resins are obtained by reacting polyisocyanates with polyols. Examples of polyols used include polyether polyols such as poly(ethylene oxide) and poly(propylene oxide), modified polyether polyols, polytetramethylene glycol, condensation polyester polyols produced by reacting dicarboxylic acids with diols, lactone-type polyester polyols produced by ring opening polymerization of ε-caprolactone or the like, and polycarbonate polyols. NGPs can be dispersed in any polyol in a liquid state and then ultrasonicated. The NGPs are typically well dispersed in the polyol to form a curing agent. The NGP-modified polyol can react with polyisocyanates to form polyurethane composites, which are one kind of NGP-reinforced elastomers. Alternatively, polyisocyanate may be used to functionalize both pristine and oxidized graphene and the resulting functionalized NGPs are then dispersed in polyisocyanate liquid medium to make a modified curing agent.

Hence, one preferred embodiment of the present invention is a modified curing agent that comprises (a) a plurality of nano graphene platelets; (b) a chemical functional group having multiple ends with a first end being bonded to a nano graphene platelet and at least a second end reactive with a thermosetting resin; and (c) reactive molecules acting as a primary cross-linking agent for the thermosetting resin; wherein the nano graphene platelets are no less than 0.01% by weight based on the total weight of said curing agent.

It may be noted that the presently invented curing agent may be mixed with an epoxy resin or any other thermosetting resin to form a reactive mixture. This mixture may be further reinforced with other additives, such as carbon fibers, glass fibers, polymer fibers, inorganic fillers, organic fillers, metal wires or fibers, carbon nano-fibers, carbon nanotubes, nano-rods, nano-wires, nano-tubes, nano-fibers, metal nano particles, ceramic nano particles, etc. For instance, this reactive mixture may be used as a matrix resin to prepare the pre-impregnated fibers or woven fabrics (so-called "prepreg"), which are precursors to a final composite structure.

The following examples serve to provide the best modes of practice for the present invention, and should not be construed as limiting the scope of the invention:

EXAMPLE 1

Pristine Nano-Scaled Graphene Platelets (NGPs) Prepared by Direct Ultrasonication of Natural Graphite Flakes Five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction for a period of 2 hours. The resulting suspension contains a huge number of ultra-thin graphene sheets floating in water. These nano graphene sheets were collected by spray-drying. TEM examination of the dried NGPs indicates that most of these NGPs had 1-5 graphene layers.

EXAMPLE 2

Exfoliation and Separation of Graphite Oxide

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å).

Graphite oxide was then inserted into a quartz tube at a temperature of 1,050° C. for 60 seconds under a flowing nitrogen condition to obtain exfoliated graphite oxide. The exfoliated graphite oxide was then ultrasonicated in water (no surfactant) for 15 minutes to obtain graphene oxide platelets. TEM examination of the resulting NGPs indicates the platelets are predominately single-layer graphene.

EXAMPLE 3

NGPs from Carbon Nano-Fibers (CNFs)

A powder sample of graphitic nano-fibers was prepared by introducing an ethylene gas through a quartz tube pre-set at a temperature of approximately 800° C. Also contained in the tube was a small amount of nano-scaled Cu—Ni powder supported on a crucible to serve as a catalyst, which promoted the decomposition of the hydrocarbon gas and growth of CNFs. Approximately 2.5 grams of CNFs (diameter of 10 to 80 nm) were dispersed in water (as in Sample 1). The sample was then subjected to ultrasonication at 20° C. for two hours to effect exfoliation and separation, followed by a mechanical shearing treatment using a rotating-blade device (Cowles). Fine NGPs with an average thickness of 4.5 nm were obtained.

EXAMPLE 4

NGPs from Short Carbon Fiber Segments

The procedure was similar to that used in Example 1, but the starting material was graphite fibers chopped into segments with 0.2 mm or smaller in length prior to dispersion in water. The diameter of carbon fibers was approximately 12 μm. After ultrasonication for 4 hours at 85 W, the platelets exhibit an average thickness of 9.8 nm.

EXAMPLE 5

Attaching Chemical Functional Groups to Oxidized NGPs

Oxidized NGPs or graphene oxide platelets obtained in Example 2 contain single- and double-bonded oxygen groups covalently attached to the surface or edges of the NGPs. These oxidized NGPs were dispersed into an amine curing agent at 4 wt % using an ultrasonicator. Examples of the curing agents used included Epikure W (diethyl toluene diaamine, or DETDA), and Jeffamine D230 (polyoxypropylene), shown below as Formula 1 and Formula 2, respectively:

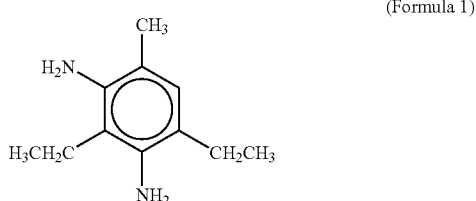
(Formula 1)

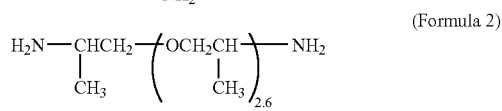
(Formula 2)

These mixtures were then heat-treated at 140° C. for 3 hours to react the amine with surface- or edge-borne oxygen, as shown in FIG. 1. The reacted mixtures were cleaned with Soxhlet Extraction in acetone for 2 days and dried in a vacuum oven at room temperature for 12 hours. The resulting powdery products are chemically functionalized NGPs.

EXAMPLE 6

Oxidized NGP-Modified Curing Agents

Portions of the chemically functionalized NGPs obtained in Example 5 were mixed into the original Epikure W and Jeffamine D, respectively, to obtain several batches of NGP-modified curing agents. The proportions of functionalized NGPs in the mixtures were in the range of 0.01% to 20% by weight for the present study. However, we were successful in adding up to 85% by weight of NGPs in the original curing agent. This surprising result might be due to the platelet geometry of NGPs that enables platelets to slide over one another without much friction in a curing agent environment.

EXAMPLE 7

Preparation of Pristine NGP-Modified Curing Agents Using Ultrasonication-Assisted Direct Functionalization Approach Pristine graphene prepared by direct ultrasonication of pristine, un-oxidized graphite (e.g., that prepared in Example 1) does not carry any double-bond or single-bond oxygen (such as in —COH, =O, —COOH, and —OH) on the graphene surface or edge. Presumably, one skilled in the art would predict that it is not possible to directly attach functional groups (such as amine) to pristine NGPs. In order to verify if this was the case, we proceeded to disperse (immerse) pristine NGPs in Epikure W and then subjected the resulting suspension to high-intensity ultrasonication (ultrasonic energy level of 110 W, Branson S450 Ultrasonicator) at approximately 90° C. for one hour. The result was most surprising in that pristine NGPs after ultrasonication-assisted functionalization were well-dispersed in the curing agent and did not undergo sedimentation for months. In contrast, NGPs dispersed in the same curing agent using a high-shear device settled to the bottom of a flask after 3 days. Not wishing to be bound by any theory, but we speculate that ultrasonication effectively activates the edges of graphene platelets which are defected sites where free radicals or dangling might exist. These highly activated sites could possibly react with amines or other curing agent molecules. SEM examination of the resulting nanocomposite samples (prepared in Example 8 below) indicates excellent dispersion of NGPs in epoxy, polyester, and phenolic resin.

EXAMPLE 8

Preparation of Cured Epoxy Resins from NGP-Modified Curing Agents

The NGP-modified curing agents prepared in Examples 6 (graphene oxide-based) and 7 (pristine graphene-based) were then mixed with Epon 862 at a one-to-four weight ratio and the mixtures were heated to 125° C. for 2 hours and 177° C. for 2 hours to complete the curing procedure for the epoxy resins. It may be noted that, in order to prepare epoxy resin samples containing different NGP proportions, modified curing agents containing different NGP proportions must be used to maintain a more or less constant curing agent-to-epoxy resin ratio. This can be easily achieved by preparing a master batch of modified curing agent containing a relatively high NGP proportion (say 50% by weight) and then diluting it according to the need of each case.

COMPARATIVE EXAMPLE 8c

Preparation of Cured Epoxy Resins by Directly Mixing Dried, Chemically Functionalized NGPs with an Epoxy Resin-Curing Agent Mixture For the comparison purpose, a sample was prepared by mixing Epon 862 with Epikure W with a proper ratio. A proper amount of the chemically functionalized NGPs obtained in Example 5 was then dispersed into the resin-curing agent mixture to ensure a curing agent-to-resin ratio of one-to-four. Several samples were prepared to cover a wide range of overall NGP proportions, from 0.01% to 5%, to prepare various NGP nanocomposites for electrical conductivity studies. The mixtures were heated to 125° C. for 2 hours and 177° C. for 2 hours to complete the curing procedure.

Four-point probe method was used to measure the electrical conductivity of various NGP-epoxy resin composites prepared in both Example 7 and Comparative Example 7c. The results were summarized in Table 1 (conductivity expressed in both linear and logarithmic scales) and plotted in FIGS. 5-7.

Figure 5:
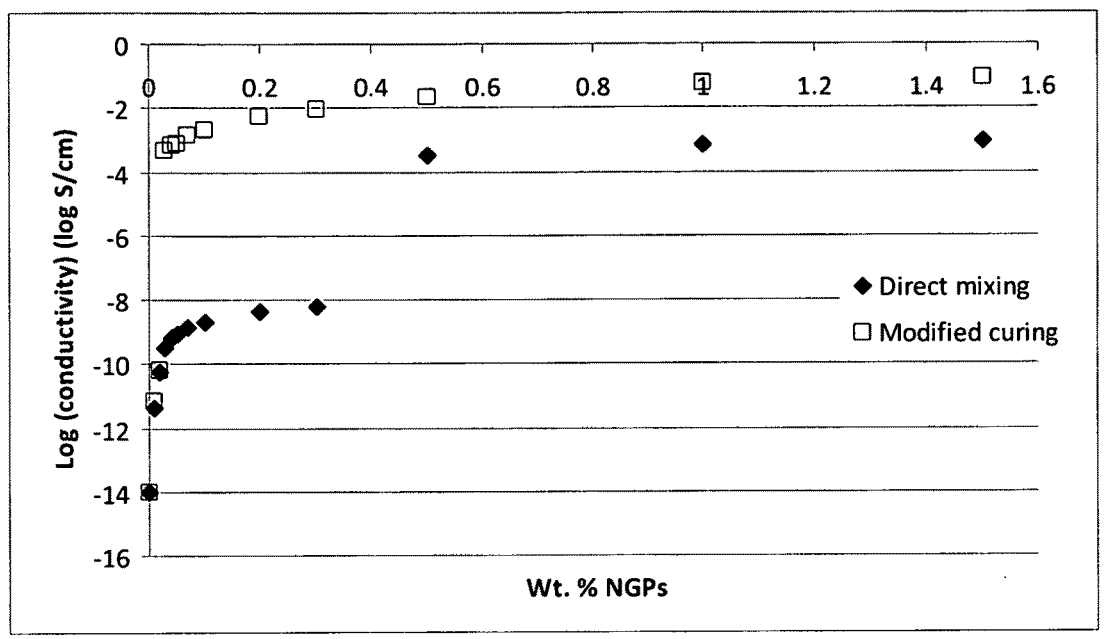
FIG. 5 Electrical conductivity of cured epoxy-pristine graphene composite samples plotted as a function of the NGP weight fraction. One curve represents conductivity data of a group of composites obtained by dispersing dried, functionalized pristine NGPs in a resin-curing agent mixture (a process herein referred to as "direct mixing"). The other curve shows the electrical conductivity of another group of composites prepared by first dispersing the functionalized pristine NGPs in a curing agent liquid medium (to form the modified curing agent), followed by mixing the modified curing agent with the epoxy resin (a process herein referred to as the "modified curing agent" approach).

Table 1 and FIG. 5 indicate that the cured epoxy composite samples obtained by dispersing dried, functionalized pristine NGPs in a resin-curing agent mixture (referred to as "direct mixing") exhibit a lower electrical conductivity as compared with their counterparts obtained in Examples 7 and 8 by producing the functionalized pristine NGPs dispersed in a curing agent liquid medium first, followed by mixing the modified curing agent with the epoxy resin (referred to as "modified curing agent" sample). The "modified curing agent" samples also exhibit a much lower percolation threshold (<0.03% NGPs) above which NGPs form a continuous network of electron-conducting paths (conductivity jumps from $10^{-12}$ S/cm to $10^{-4}$ S/cm). The composite samples obtained by direct mixing (dispersing dried NGPs in a mixture of the unmodified curing agent and epoxy resin) show a percolation threshold at approximately 0.4% by weight of NGPs, one order of magnitude higher. These highly surprising observations quite possibly suggest that the modified curing agent approach (dispersing curing agent molecule-functionalized NGPs in a curing agent liquid medium prior to mixing the modified curing agent with the resin) led to a much better or more homogeneous dispersion of NGPs in an epoxy matrix.

TABLE 1

Conductivity data of NGP-epoxy resin composites prepared by direct mixing and modified curing agent approaches from both pristine graphene and graphene oxide.

| Pristine NGP wt. % | Direct mixing Conduc. S/cm | Modified Curing agent, MCA Conduc. S/cm | Direct mixing Log scale | MCA Log scale | GO wt. % | Direct Mixing Conduc. S/cm | Modified Curing agent Conduc. S/cm | Direct mixing Log scale | MCA Log scale |
|---|---|---|---|---|---|---|---|---|---|
| 0 | 1.00E−14 | 1.00E−14 | −14 | −14 | 0 | 1.00E−14 | 1.00E−14 | −14 | −14 |
| 0.01 | 4.30E−12 | 6.80E−12 | −11.37 | −11.17 | 0.01 | 2.30E−13 | 6.20E−13 | −12.6 | −12.2 |
| 0.02 | 5.60E−11 | 6.20E−11 | −10.25 | −10.21 | 0.02 | 4.90E−13 | 8.90E−12 | −12.3 | −11.1 |
| 0.03 | 3.10E−10 | 4.70E−04 | −9.509 | −3.328 | 0.03 | 1.10E−12 | 4.30E−05 | −12 | −4.37 |
| 0.04 | 6.70E−10 | 6.80E−04 | −9.174 | −3.167 | 0.04 | 2.70E−12 | 6.40E−05 | −11.6 | −4.19 |

TABLE 1-continued

Conductivity data of NGP-epoxy resin composites prepared by direct mixing and modified curing agent approaches from both pristine graphene and graphene oxide.

| Pristine NGP wt. % | Direct mixing Conduc. S/cm | Modified Curing agent, MCA Conduc. S/cm | Direct mixing Log scale | MCA Log scale | GO wt. % | Direct Mixing Conduc. S/cm | Modified Curing agent Conduc. S/cm | Direct mixing Log scale | MCA Log scale |
|---|---|---|---|---|---|---|---|---|---|
| 0.05 | 8.30E−10 | 7.60E−04 | −9.081 | −3.119 | 0.05 | 6.90E−12 | 7.20E−05 | −11.2 | −4.14 |
| 0.07 | 1.32E−09 | 1.40E−03 | −8.879 | −2.854 | 0.07 | 2.40E−11 | 1.10E−04 | −10.6 | −3.96 |
| 0.1  | 2.10E−09 | 2.10E−03 | −8.678 | −2.678 | 0.1  | 6.40E−11 | 1.60E−04 | −10.2 | −3.8 |
| 0.2  | 4.10E−09 | 5.40E−03 | −8.387 | −2.268 | 0.2  | 1.70E−10 | 3.40E−04 | −9.77 | −3.47 |
| 0.3  | 6.40E−09 | 8.90E−03 | −8.194 | −2.051 | 0.3  | 6.30E−10 | 6.00E−04 | −9.2  | −3.22 |
| 0.5  | 3.20E−04 | 2.10E−02 | −3.495 | −1.678 | 0.5  | 4.40E−05 | 1.10E−03 | −4.36 | −2.96 |
| 1    | 6.50E−04 | 5.60E−02 | −3.187 | −1.252 | 1    | 8.90E−05 | 2.30E−03 | −4.05 | −2.64 |
| 1.5  | 8.90E−04 | 8.80E−02 | −3.051 | −1.056 | 1.5  | 2.40E−04 | 4.00E−03 | −3.62 | −2.4 |

Figure 6:
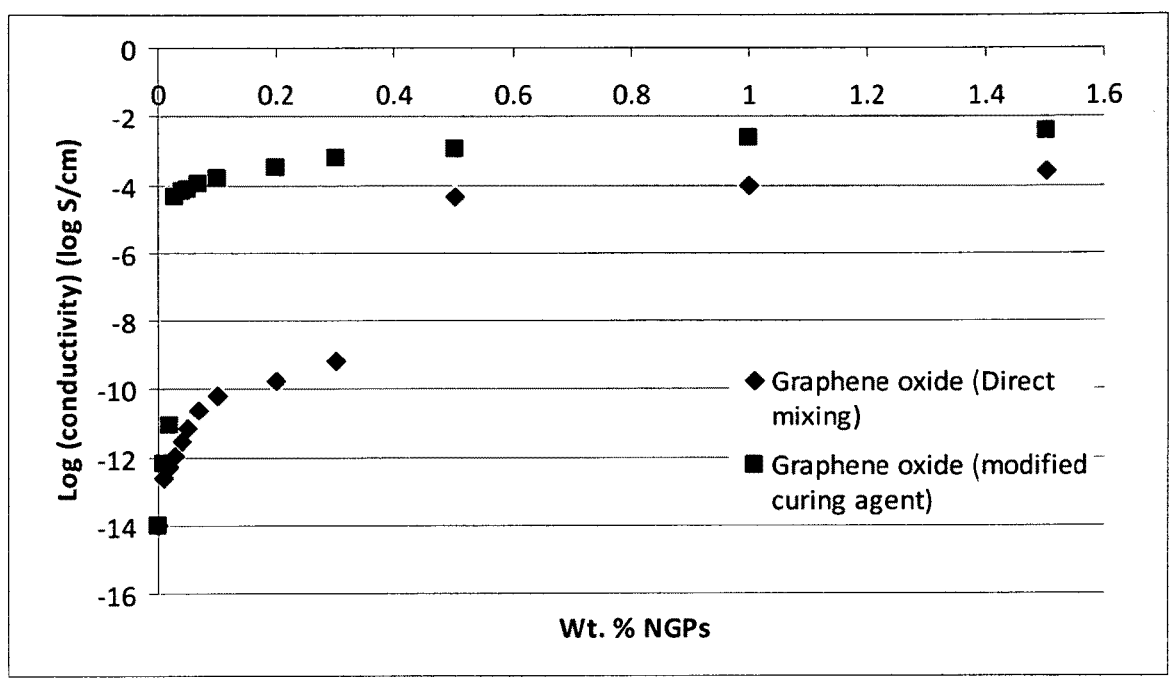
FIG. 6 Electrical conductivity of cured epoxy-oxidized graphene composite samples (prepared by the direct mixing and modified curing agent approaches, respectively) plotted as a function of the NGP weight fraction.

Similarly, Table 1 and FIG. 6 demonstrate that the oxidized NGP-epoxy composites obtained by the "modified curing agent" approach exhibit a higher conductivity and a lower percolation threshold as compared with the composites obtained by the "direct mixing" approach. These observations are beyond and above what would be expected by one skilled in the art.

Figure 7:
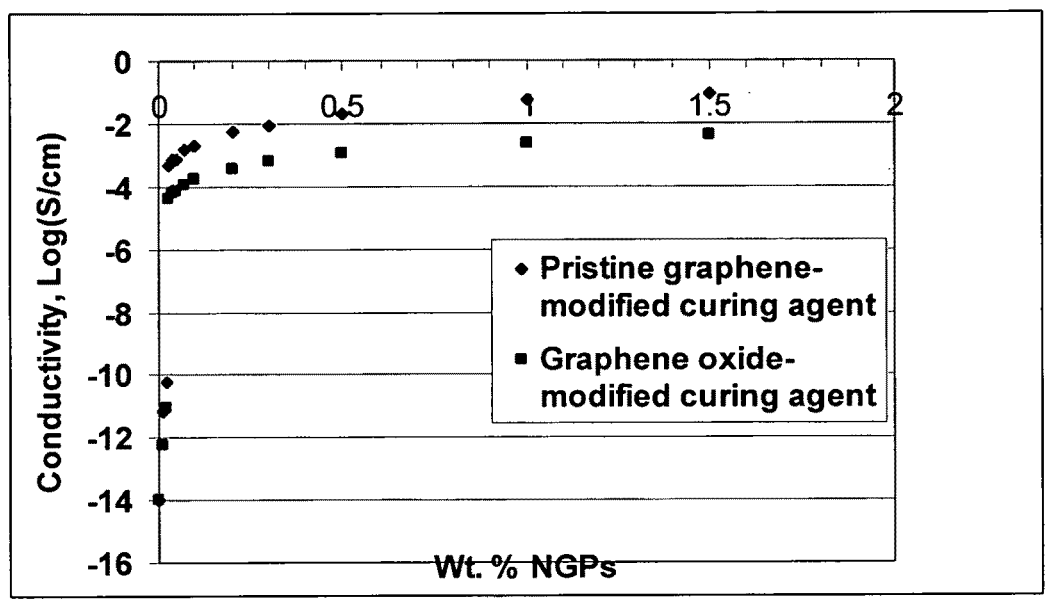
FIG. 7 Electrical conductivity of cured epoxy-pristine graphene composite and graphene oxide composite samples both plotted as a function of the NGP weight fraction.

FIG. 7 shows that the pristine NGP-based materials have a much higher conductivity as compared with the graphene oxide-based materials. Again, it is quite surprising that we were able to chemically attach a functional group of essentially any curing agent to the edge or surface of pristine NGPs to enable good dispersion in and good interfacial adhesion with a thermoset resin.

EXAMPLE 9

Attaching Epoxide-Based Functional Groups to Oxidized NGPs

Figure 4:
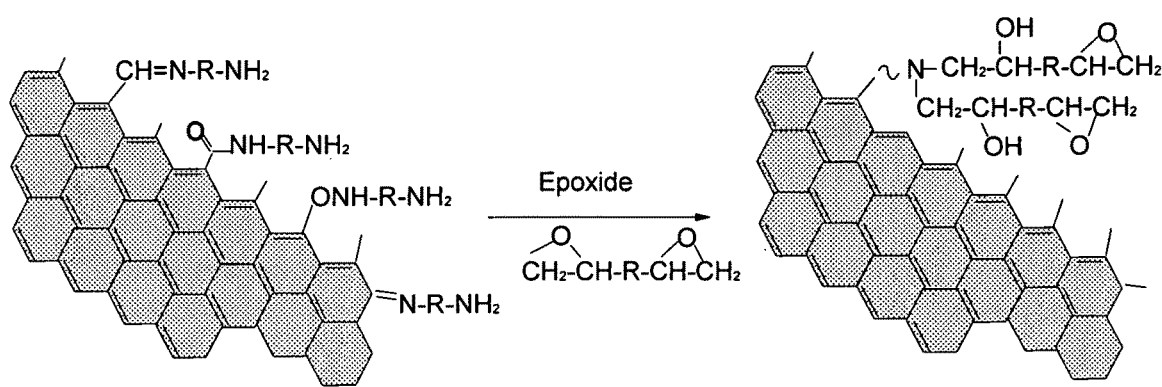
FIG. 4 Amine-functionalized NGPs may be pre-reacted with an epoxide group to form an epoxy-type chain, making it naturally compatible with the epoxy resin.

Portions of the extracted NGPs obtained in Example 5 were dispersed into Epon 862 at 8 wt % and heated to 125° C. for 2 hours and 177° C. for 2 hours to react the epoxy with the amine groups attached to the NGPs (FIG. 4). This mixture was cleaned with Soxhlet Extraction in acetone for 2 days and dried before next step. The resulting epoxide-functionalized NGPs were dispersed in Epikure to form a modified curing agent containing NGPs.

The epoxide-functionalized NGPs can be dispersed in one of the two components of a thermosetting polyurethane resin or a phenolic resin to form a modified curing agent.

In conclusion, the presently invented approach of preparing NGP composites has many advantages over prior art approaches. Summarized below are some of the more salient features or advantages:

(1) The present method is versatile and applicable to essentially all curing agents for epoxy and other thermoset resins.
(2) The method does not involve a high chemical reaction temperature and does not require the use of undesirable functionalization conditions (e.g., using radio frequency plasma or a strong acid).
(3) The method is applicable to both pristine graphene and graphene oxide. The resulting pristine NGP-based composites exhibit excellent conductivity.
(4) The method is simple, fast, scalable and, hence, amenable to mass production of superior curing agents.
(5) The modified curing agents have a long shelf life and can be manufactured at one location and easily shipped to another location. The epoxy resin user or composite material fabricator does not have to use the curing agent immediately upon receipt of the curing agents.

The invention claimed is:

1. An epoxy curing agent comprising: (a) a plurality of nano graphene platelets that are pristine graphene; (b) a chemical functional group having multiple ends with a first end being bonded to a nano graphene platelet and at least a second end reactive with an epoxy resin; and (c) reactive molecules acting as a primary cross-linking agent for the epoxy resin; wherein said nano graphene platelets are dispersed in said reactive molecules and the proportion of said platelets is no less than 0.01% by weight based on the total weight of said curing agent.

2. The curing agent of claim 1 wherein said nano graphene platelets comprise single-layer graphene.

3. The curing agent of claim 1 wherein said chemical functional group is derived from a reactive molecule selected from the group consisting of amidoamines, polyamides, aliphatic amines, modified aliphatic amines, cycloaliphatic amines, aromatic amines, anhydrides, ketimines, diethylenetriamine, triethylene-tetramine, tetraethylene-pentamine, polyethylene polyamine, polyamine epoxy adduct, phenolic hardener, non-brominated curing agent, non-amine curatives, and combinations thereof.

4. The curing agent of claim 1 wherein said pristine graphene is produced by direct ultrasonication of a pristine graphitic material that is not pre-intercalated and not pre-oxidized.

5. The curing agent of claim 4 wherein said pristine graphitic material is selected from the group consisting of natural graphite, synthetic graphite, highly oriented pyrolytic graphite, carbon or graphite fiber, carbon or graphitic nano-fiber, meso-carbon micro-bead, and combinations thereof.

6. The curing agent of claim 1 wherein said chemical functional group comprises an epoxy group.

7. The curing agent of claim 1 wherein said chemical functional group is derived from one of said reactive molecules.

8. The curing agent of claim 1 wherein said chemical functional group is bonded to a nano graphene platelet through ultrasonication.

9. The curing agent of claim 1 wherein said chemical functional group is bonded to a nano graphene platelet through ultrasonication of a suspension containing nano graphene platelets dispersed in reactive molecules selected from the group consisting of amidoamines, polyamides, aliphatic amines, modified aliphatic amines, cycloaliphatic amines, aromatic amines, anhydrides, ketimines, diethylenetriamine, triethylene-tetramine, tetraethylene-pentamine, polyethylene polyamine, polyamine epoxy adduct, phenolic hardener, non-brominated curing agent, non-amine curatives, and combinations thereof.

10. A modified curing agent comprising: (a) a plurality of chemically functionalized pristine graphene having at least a chemical functional group reactive with a thermosetting resin; and (b) reactive molecules acting as a primary cross-linking agent for the thermosetting resin; wherein said functionalized nano graphene platelets are dispersed in said reactive molecules and said platelets occupy no less than 0.01% by weight based on the total weight of said modified curing agent.

11. The modified curing agent of claim 10 wherein said nano graphene platelets comprise single-layer graphene.

12. The modified curing agent of claim 10 wherein said nano graphene platelets comprise pristine graphene.

13. The modified curing agent of claim 10 wherein said chemical functional group is derived from a reactive molecule selected from the group consisting of amidoamines, polyamides, aliphatic amines, modified aliphatic amines, cycloaliphatic amines, aromatic amines, anhydrides, ketimines, diethylenetriamine, triethylene-tetramine, tetraethylene-pentamine, polyethylene polyamine, polyamine epoxy adduct, phenolic hardener, non-brominated curing agent, non-amine curatives, polyols, polyisocyanates, and combinations thereof.

14. The modified curing agent of claim 10 wherein said reactive molecules are selected from the group consisting of amidoamines, polyamides, aliphatic amines, modified aliphatic amines, cycloaliphatic amines, aromatic amines, anhydrides, ketimines, diethylenetriamine, triethylene-tetramine, tetraethylene-pentamine, polyethylene polyamine, polyamine epoxy adduct, phenolic hardener, non-brominated curing agent, non-amine curatives, polyols, polyisocyanates, and combinations thereof.

15. An epoxy resin mixed with the curing agent of claim 1.

16. A thermoset resin mixed with the curing agent of claim 10.

17. An epoxy resin matrix composite comprising a resin reacted with the curing agent of claim 1.

18. A thermoset resin matrix composite comprising a resin reacted with the curing agent of claim 10.

19. An epoxy resin mixed with the curing agent of claim 1, further comprising an additive selected from the group consisting of carbon fibers, glass fibers, polymer fibers, inorganic fillers, organic fillers, metal wires or fibers, carbon nano-fibers, carbon nanotubes, nano-rods, nano-wires, nano-tubes, nano-fibers, metal nano particles, ceramic nano particles, and combinations thereof.

20. A thermoset resin mixed with the curing agent of claim 10, further comprising an additive selected from the group consisting of carbon fibers, glass fibers, polymer fibers, inorganic fillers, organic fillers, metal wires or fibers, carbon nano-fibers, carbon nanotubes, nano-rods, nano-wires, nano-tubes, nano-fibers, metal nano particles, ceramic nano particles, and combinations thereof.

21. The modified curing agent of claim 10, wherein the thermosetting resin comprises a resin selected from the group consisting of unsaturated polyester, phenolic, polyimide, polyurethane, polyamide-imide, thermosetting elastomers or rubbers, and combinations thereof.

* * * * *